Oct. 4, 1938.  Z. TADROS  2,131,989

APPARATUS FOR MECHANICALLY OPERATING LEVEL CROSSING GATES

Filed July 7, 1936  9 Sheets-Sheet 1

INVENTOR
Zaky Tadros
BY S. Sokal
ATTORNEY

Oct. 4, 1938.     Z. TADROS     2,131,989
APPARATUS FOR MECHANICALLY OPERATING LEVEL CROSSING GATES
Filed July 7, 1936     9 Sheets-Sheet 2

INVENTOR
Zaky Tadros
BY
S. Sokal
ATTORNEY

Oct. 4, 1938.            Z. TADROS                    2,131,989
   APPARATUS FOR MECHANICALLY OPERATING LEVEL CROSSING GATES
           Filed July 7, 1936           9 Sheets-Sheet 4

INVENTOR
Zaky Tadros
BY
S. Sokal
ATTORNEY

Oct. 4, 1938.  Z. TADROS  2,131,989
APPARATUS FOR MECHANICALLY OPERATING LEVEL CROSSING GATES
Filed July 7, 1936  9 Sheets-Sheet 5

INVENTOR
Zaky Tadros
BY
S. Sokal
ATTORNEY

Patented Oct. 4, 1938

2,131,989

UNITED STATES PATENT OFFICE 2,131,989

APPARATUS FOR MECHANICALLY OPERATING LEVEL CROSSING GATES

Zaky Tadros, Cairo, Egypt

Application July 7, 1936, Serial No. 89,274
In Greece July 23, 1935

14 Claims. (Cl. 246—293)

This invention is a mechanical arrangement for the automatic closing and re-opening of level railway crossings, whereby the train itself, at a distance to be fixed beforehand say of three to five kilometers, can close the crossing barriers and at the same time put into action various conventional sound, sight and light signals. Thus, for instance, at a suitable distance from the crossing, the whistle of the locomotive is automatically made to sound continuously or intermittently and, simultaneously, certain bells of the barrier-posts of the level crossing begin to ring continuously; after a sufficient interval of time the barriers begin to close slowly, until they are locked in a "closed" position. Simultaneously with the closing of the barriers, various mechanical and luminous signals are shown, by day or by night, to the driver of the train and the drivers of road vehicles to indicate whether the line is clear or not.

After the train has passed the crossing, the barriers are re-opened automatically and locked in their "open" positions, the whistle and bells cease to sound and the signals for vehicles and trains are reversed to their ordinary positions.

This arrangement is purely mechanical and automatic and requires no electric current or handling by a railway employee.

In the following pages I give an example (accompanied by drawings) of the attainment of the object of my invention, without confining the invention to that particular example.

In the drawings, 1 is a box with a slot 2 on its top, which can be covered in any suitable manner. Within the box 1 an operating rod 3 of the whole device is slidably mounted. The box is placed close to a railway track at a suitable distance from a level crossing, say anywhere from 2 to 5 kilometers or even further. This rod 3 can slide by means of rollers 4—4 and 5—5 between two pairs of converging guides 6—6, 7—7 arranged within the box (see Figs. 6 and 7). The rod 3 turns on a shaft 8 and is constantly drawn upward by a suitable spring or springs 9. By a suitable arrangement, not shown in the drawings, the angle of inclination of the rod to the horizontal, can be adjusted. This rod is fitted at the top with rollers 10—10, to be engaged by an attachment to the locomotive, as will be explained hereinafter. The lower end of the rod is connected to a set of strong springs 11—11, which in their turn are connected with an operating wire or wire-rope 12. At a suitable distance alongside of box 1 and below it, is arranged a smaller box 13 (see Figs. 6 and 7) within which reversible spring-locks 16—16 are placed at 16'—16' in such manner that under the action of their springs they are constantly pressed upward, slightly projecting through a suitable slot in the bottom of box 1, so that they act as stops preventing backward movement of rod 3 when the latter is in the position shown by dotted lines in Figs. 1 and 6. These locks 16—16 are fixed to angle-irons 17—17, on which act eccentrics 15—15 fixed on a shaft 14, when a member of a time-regulator 24 (hereinafter described) at a given moment acts on a small lever 19 fixed to the shaft 14, to lower the locks 16—16 and thus clear the way for rod 3 to return to its original position. A spring 18 acting upon shaft 14, tends under normal conditions to maintain the lever 19 in a horizontal position. Suitable buffers 20—20 are arranged within box 1, to absorb any shocks due to the movements of rod 3.

The operating wire-rope 12 (Fig. 2) passing around a guide pulley 21, divides into two branches: one branch 22 leads to the time-regulator 24, which is placed beside box 1 and near to the smaller box 13; the other branch passes over a set of pulleys 21'—21', to a mechanism affixed to barrier-posts 25 of the level crossing, which works the barriers, the bells and the various warning signals.

It is to be noted that suitable springs 62 and 63 are inserted in series in each of the aforesaid branches for the purpose of distributing the pull, when rod 3 is moved by the attachment of the locomotive, as will presently be described.

Figures 13, 18:
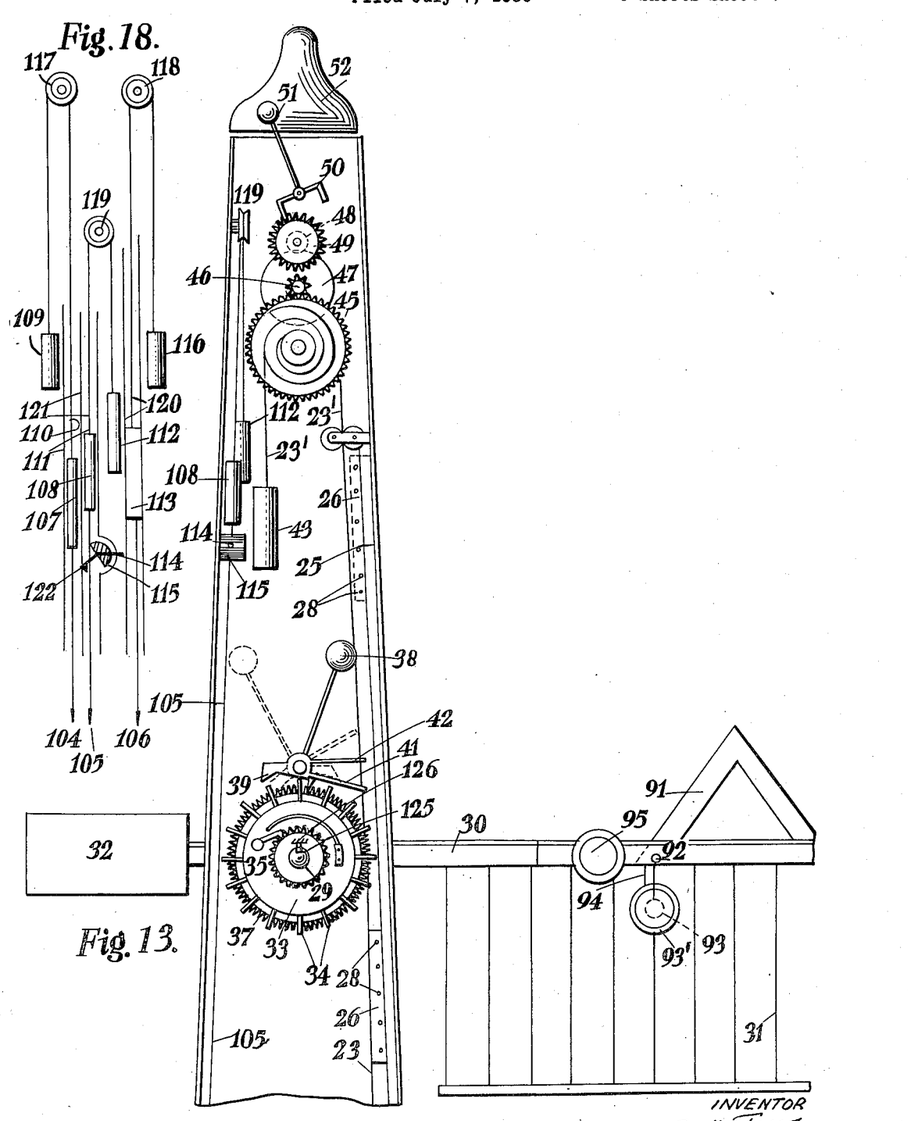
Figs. 13 and 14 are a partial front and side elevation respectively of barrier-posts, showing a bell mechanism and the working of the barriers.
Fig. 18 is a diagrammatic view of a detailed operating mechanism.

The arrangement of the various devices attached to one of the barrier-posts at the level crossing (Figs. 13 and 14) is as follows: In the walls of the post a shaft 29 is mounted, to which is fixed a beam 30 of a barrier 31. This beam is fitted with a counterweight 32. Also, on the said shaft there is loosely mounted a drum 33, on the periphery of which there are a number of spikes 34 projecting radially. When this drum or wheel, shown in Fig. 13, is turned counterclockwise, it moves freely on the shaft 29; but when turned clockwise, it locks with the shaft by means of a locking pawl 35 and a toothed wheel 36, fixed to the shaft 29, and can turn the latter and thereby also the beam 30.

At a certain distance from drum 33 a toothed wheel 37 is firmly fastened to the shaft, which co-operates with a double lock 39 fitted with a counterweight 38. This double lock locks the shaft 29 and hence the beam 30 against opening or closing.

For this purpose, the said double lock 39 has two arms (41 and 41'), arranged at a suitable angle with regard to each other, so that, in the two end positions of the lock, one or the other arm is about horizontal and projects into the upward or downward path of a projection 28' on a slide 26, which slides between two upright guides 27 placed at a suitable distance from the aforesaid wheels 33, 37.

This slide is fitted on one of its sides with a projection 28' which co-operates with the aforesaid arms 41 and 41' of the double lock, and on its other side with a number of similar projections 28 which co-operate with radial spikes 34 of the drum 33. The projections 28 of the slide 26 are set at the same intervals as the spikes 34 of the drum 33, and their number is equal to the number of spikes set on one quarter of the drum's circumference so that when the last projection 28 of the slide ceases to be in contact with the spikes of the drum, the latter has made a quarter-revolution (90°) and consequently the beam 30 will have opened or shut. The slide 26 is attached at its lower end to the operating wire-rope 23 and at its upper end to another wire-rope 23' carrying a counterweight 43 and wound around a helical drum or worm 44, the surface of which forms a continuous transition curve of various radii, so that the difference between the pull exerted by the counterweight and that exerted by the wire-ropes is kept practically constant.

The worm 44 can through the medium of a series of toothed wheels 45, 46, 47, 48 and 49 actuate the clapper 51 of a bell 52 fitted with an escapement 50.

Figures 14, 15, 16, 17, 17A:
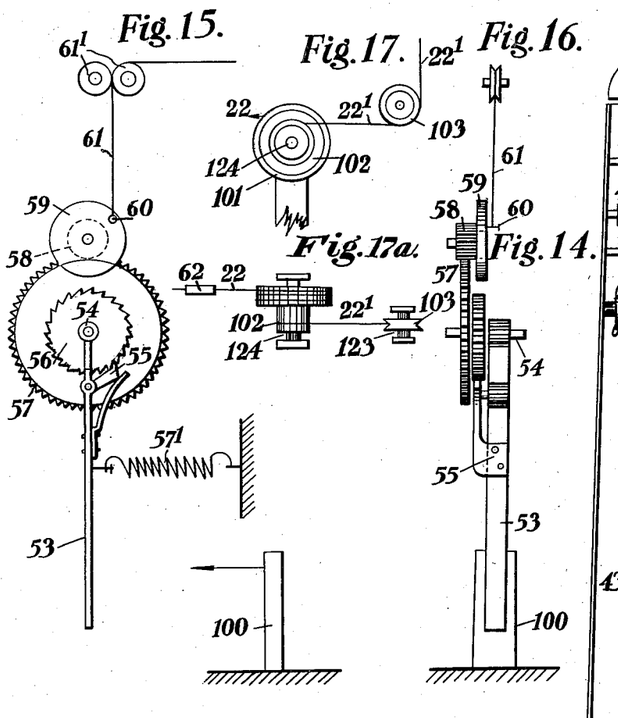
Figs. 15 and 16 are respectively a front and a side elevation of a mechanism for operating a whistle of the locomotive.
Fig. 17 is a side elevation of a detail of a modification.
Fig. 17a is a plan view thereof.
Figure 18A:
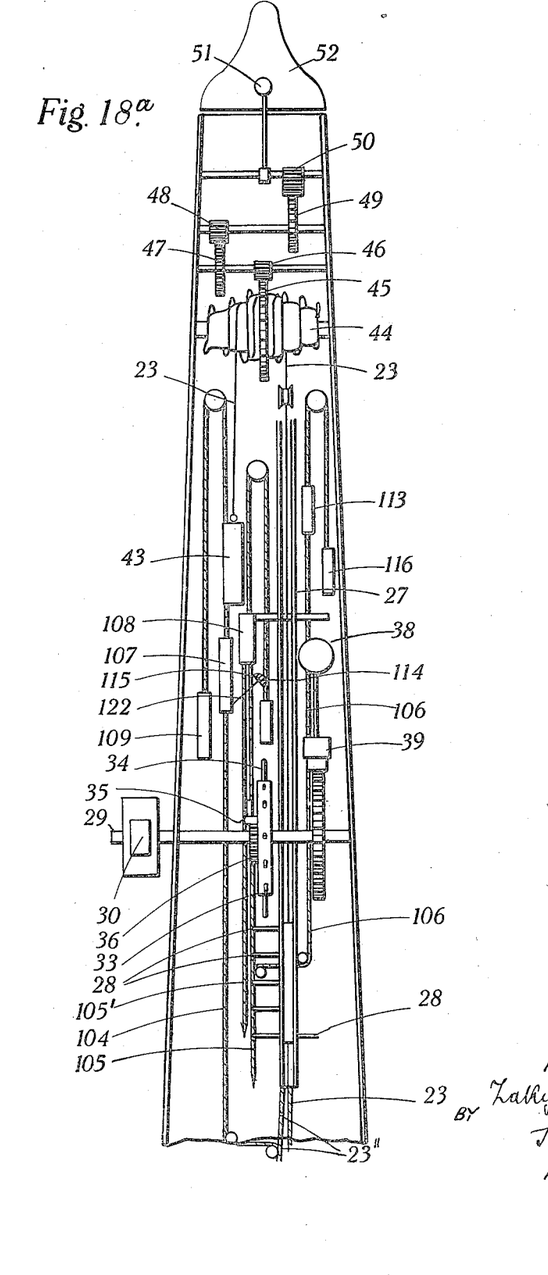
Fig. 18a is a similar view to Figure 14 but including the mechanism of Figure 18.

Figs. 15 and 16 show the device for automatically operating the whistle of the locomotive. This device may be arranged in any suitable position on the locomotive. It consists of an arm 53 which can pivot around a shaft 54 and carries a spring lock 55 engageable with a toothed wheel 56. A spring 57' fastened at one end to the body of the locomotive and at the other end to the said arm, keeps the latter constantly pointing in the direction in which the locomotive is travelling. When a train, approaching a level crossing, reaches the pre-determined point, say 2 to 5 kilometers from the crossing, the said arm 53 strikes a succession of pegs 100 driven at suitable intervals into the ground within the gabarit. As the train advances, the arm 53 swings about the shaft 54, until free from the pegs 100, whereupon it tends to swing back to its original position owing to the pull of the spring 57', carrying with it, through the medium of the spring lock 55, the toothed wheel 56, together with a pinion 57 concentric therewith on the shaft 54. The pinion 57 then turns a pinion 58, which carries a disc 59 having a button 60 eccentrically mounted thereon to which is attached one end of a chain 61, the other end of which is fastened to the lever or throttle of the locomotive's whistle. Thus, owing to the revolutions of the eccentric disc 59, the whistle is sounded automatically and intermittently, as if it were operated by hand.

As above stated, the branch 22 of the operating wire-rope 12 leads to the time-regulator. This branch 22 (see Figs. 8, 9, 10 and 11) passes around the pulley drum or worm 64, 65, the surface of which presents a continuous transition curve of various radii, for the same reason as set forth above with regard to the worm 44, and carries at its end a counterweight 66.

The drum 64, 65 is fastened to the shaft 67, which is rotatably carried in bearings 68. To the said shaft 67 is also keyed a pulley 69, which through the medium of pulleys 70—70 and a driving belt 71 transmits a rotary movement to the pulley 72. The latter, fixedly secured to a shaft 76, can revolve freely in a counter-clockwise direction, as, for instance, if moved by the pull of the counterweight 66. If, however, force is exerted upon it in a clockwise direction, for instance, by the pull of the operating wire-rope 22, then through the medium of a pawl 73 it engages a toothed wheel 74 and causes the latter to rotate together with a two-part cylindrical member 75 and 81 secured thereto having helical co-operating end faces. Simultaneously, the toothed wheel 77, fixed to the shaft 76, transmits a rotary movement in a counter-clockwise direction to the pinion or gear wheel 78, which is loosely mounted on shaft 76 by means of the pawl 79. The toothed wheel 78 transmits the movement to a set of gear wheels indicated generally by 80 in Figs. 8 and 9.

Figure 8:
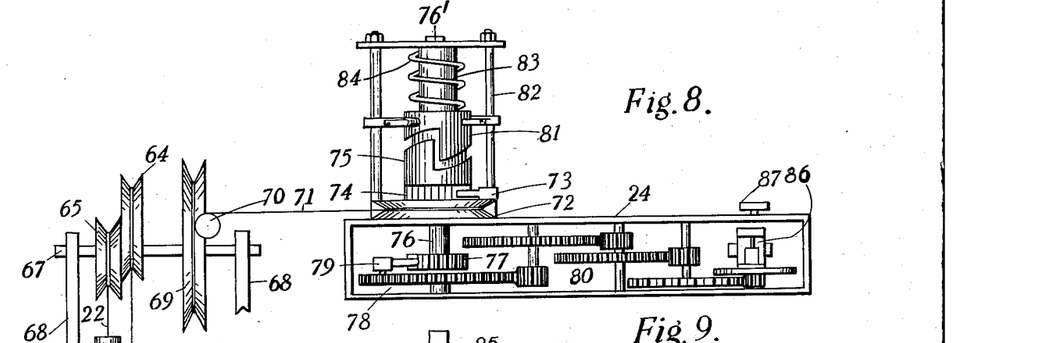
Fig. 8 is a cross section of a time-regulating device which regulates the time of closing and re-opening barriers.
Figures 9, 10, 11:
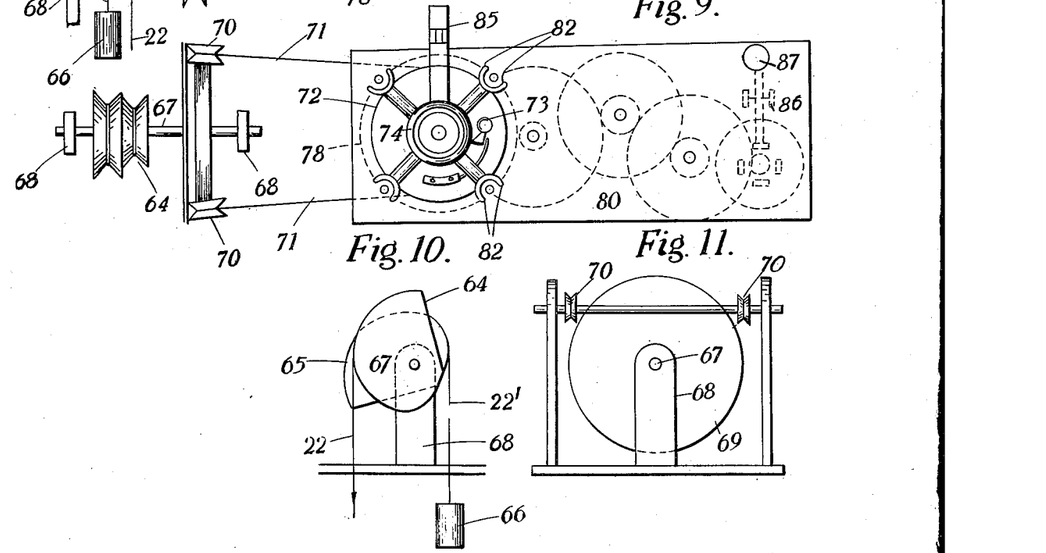
Fig. 9 is a plan corresponding to Fig. 8.
Fig. 10 is an elevation of a detail of the mechanism.
Fig. 11 is an end view of the mechanism shown on the left of Fig. 8.

When the cylindrical part member 75 is rotated in the same direction as the handle of a lock, its upper cam surface slides under the other similarly shaped cylindrical part member 81 which, although prevented by guides 82 from rotating, is free to move axially along a vertical rod 83, the diameter of which is slightly smaller than the bore of the part member 81, so as to allow the latter to slide freely thereon. It may be mentioned that to facilitate the replacement of any parts above the drum 72, they are mounted on a separate axle or shaft 76'. If desired, instead of two shafts, only one may be employed, around which the pulley 72 can revolve freely, if the wheel 77 and lock pawl 79 were omitted.

Figure 12:
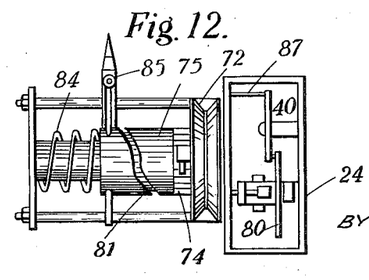
Fig. 12 is an end view of the time control mechanism shown in the right half of, and looking in the direction of the arrow in, Fig. 8.

By the rotation of the lower part member 75 the upper part member 81 is slowly and gradually raised by the steady contact of the cam surfaces of the two parts and reaches its uppermost position when the lower part 75 has made one complete revolution (360°). At that moment the upper part 81, under the action of a spring 84 falls abruptly to its original position from a height equal to the height of the cam surface on which it has risen. The upper part 81 has a projection 85 thereon (see Fig. 12), which, on the fall of the part 81, strikes the small lever 19 of the locking device of the aforesaid rod 3 in the box 1 (see Figs. 6 and 7) and through the action of the eccentrics 15 lowers the locks 16 and leaves the rod 3 free to return to its original position.

The time required for completely raising the part 81 and hence for completely releasing the rod 3 from the locks 16 can be regulated by a braking device 86 with which the last wheel of the gearing 80 is fitted and by means of which the angular speed of the wheels and the gearing 80 is regulated through the medium of a key 87.

The mechanism operates in the following manner:

To the locomotive (see Figs. 1, 3, 4 and 5), at a suitable position with respect to the box 1 on the ground, is secured a two-pronged steel spring 88, between the prongs of which the rod 3 passes until the said spring bears against the rollers 10 and so moves the rod 3 forward. The spring 88 consists of a bundle of springs hinged at 89 to the locomotive so that when the locomotive for any reason moves backward, the bundle of springs 88 yields and pivots on the hinge 89 whereby damage to rod 3 is prevented. When the spring 88 engages the rod 3, it moves it from the position shown by the full lines to the position indicated by the dotted lines in Fig. 1 where the rod is released from the springs, first, owing to the elasticity produced by the spring 9, and secondly, owing to the downward movement of the rod due to the converging guides 6—6 and 7—7.

Figures 1, 3, 19:
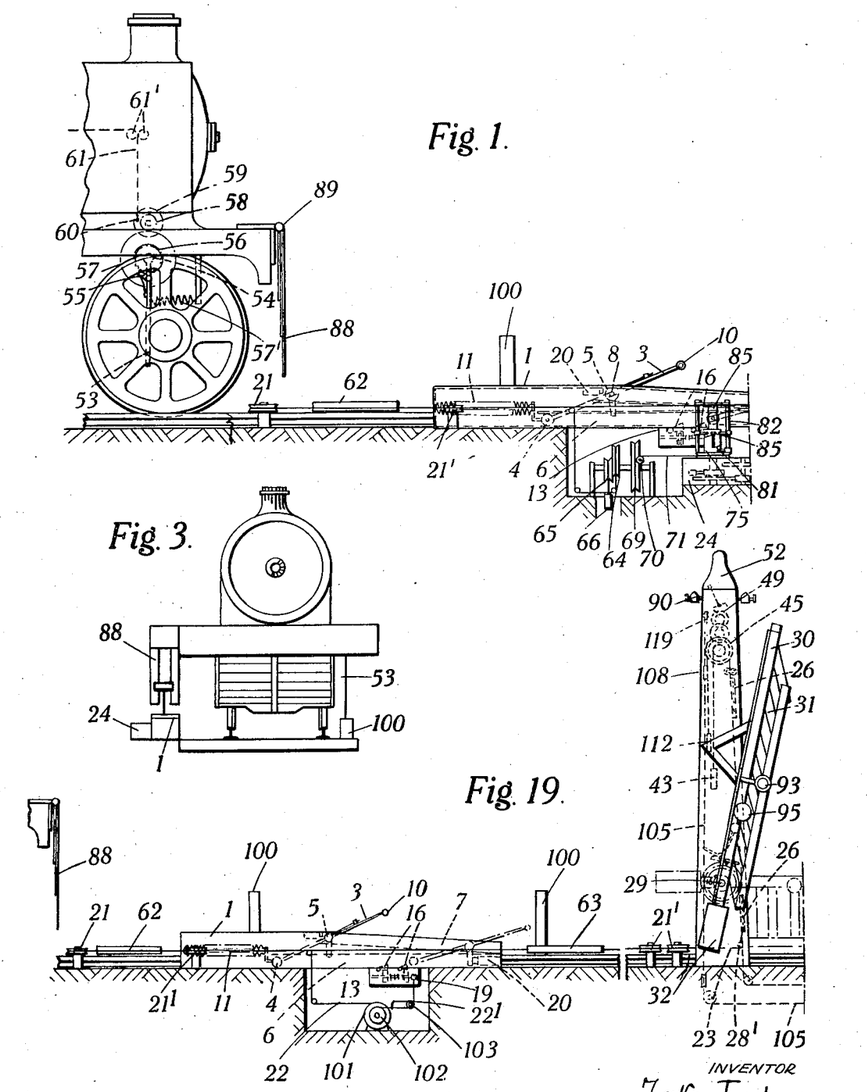
Figs. 1 and 1a are right and left-hand portions respectively of a side elevation of a railway track at a level crossing, showing the general arrangement of my device.
Fig. 3 is a front view of a locomotive fitted with an attachment, which puts my invention into operation.
Figs. 19 and 19a are left and right-hand portions respectively of a side view of a railway track at a level crossing showing a modified arrangement.
Figure 1A:
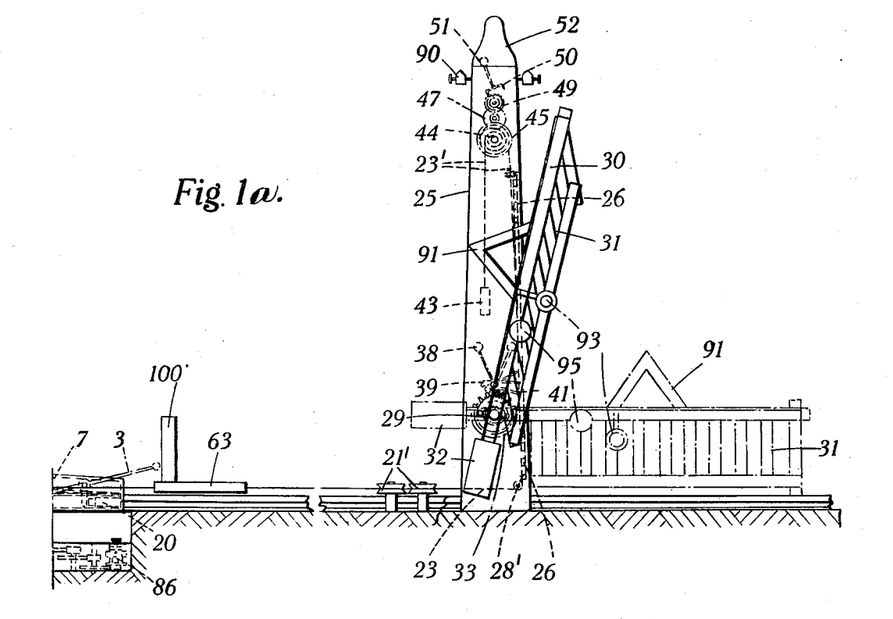

In order that the engaging operation may not fail owing to any vertical or horizontal oscillation of the locomotive, on the one hand, the rod 3 is held by the springs 88 constantly in a vertical position and moves downward only when the pressure exerted by the spring exceeds a certain limit, and on the other hand, when the distance between the two prongs of spring 88 and the length of the rollers 10 is slightly greater than required.

When the rod 3 is released from engagement with the spring 88, it cannot return to its original position owing to the presence of the spring locks 16. In this position it pulls on the springs 11, which in their turn pull on the operating wire-rope 12. The force of this pull, through springs 62 and 63 and the wire-ropes 22 and 23, is passed on to the time-regulator 24 and to the mechanism operating the barriers and the signals.

The wire-rope 22, being now stretched, exerts a pull on the rim of the drum 64, 65, and sets in motion the drum 69, which is fixed to the shaft 67. This drum 69, by means of its pulleys 70 and the belt 71 (Fig. 9) transmits the rotary movement to the drum 72 of the time-regulator 24 and thus, by reason of the non-reversing pawl 73, causes the movement of the releasing device 81—85 of the locks 16 and operates the clock-mechanism 80, which regulates the time of release.

Meanwhile, by the pull exerted by the other wire-rope 23, the slide 26 on the gate-post 25, which is in the position indicated by the dotted lines, is drawn downwards and through wire-rope 23', sets in motion the worm 44 which, through the medium of its system of toothed wheels 45'—49 operates the clapper 51 of the bell 52. The slide 26, in its descent, strikes with its projection 28' on the rod 41 of the double lock 39, which is in the position indicated by the dotted lines, and moves it to the position shown by the full lines, where the mechanism of the beam of the barrier (30, 31) is unlocked and can be turned to a "closed" position. The slide 26, continuing on its descent, strikes, with the projection 28 on its opposite side, the spikes 34 which project radially from the wheel 33, and causes the shaft 29 to revolve, thereby lowering the beam 30 through the medium of the locking pawl 35, which acts upon the toothed wheel 36 fixed to the shaft 29. The beam is locked in the "closed" position by the point of the double lock 39, which has been moved to the position indicated by the full lines. Simultaneously, the signals 20 arranged along the top of the barrier and the distance posts and connected by wires (not shown in the drawings) directly with the drum 33, are depressed, to show to the driver of the train that the line is clear and the barrier 31 is closed.

When the barrier is closed, a red triangle 91 arranged on the centre of the beam 30, is shown to warn the drivers of approaching road vehicles (see Fig. 13). This triangle is hinged at one of its lower corners to the beam 30 and is fitted with a counterweight so as to remain constantly in an upright position. This counterweight may be, as shown in Fig. 13, a lantern 93 trimmed to burn a week and attached to the triangle 91 by a vertical arm 94 fastened to the hinge 92. This lantern thus performs a double service of a counterweight and a luminous indicator.

A red glass disc is fixed to each beam 30 so that when the barrier is closed, i. e. when the beam 30 is in a horizontal position, the red disc moves into place in front of the lantern and thus presents a red light to approaching vehicles. When the barrier is open, i. e. when the beam is in a vertical position, the triangle 91 remains upright by reason of its counterweight or any additional weight that may be required, but is not visible to approaching vehicles, being hidden by the rails of the barrier.

A green glass disc 95 is fastened to the beam so that, when the barrier is open, the disc moves into position in front of the lantern 93 and thereby shows a green light to approaching vehicles.

The time regulator 24 is so arranged that the part 81 with its projection 85 has reached its highest position when the train arrives at the level crossing. Then the part 81, under the action of the spring 84, falls sharply back into its original position and the projection 85 acts upon the lever 19 and releases rod 3 from the locks 16, as described above. The rod 3, under the action of the springs 11, returns to its original position and the strain upon the wire-ropes 22 and 23 is relaxed. The counterweights 66 and 43 restore the various working parts to their original positions. The slide 26 rises, the projection 28' thereon strikes against the arm 42 of the double lock 39 and moves it back into the position indicated by the dotted lines, where it remains stationary by reason of counterweight 38. The counterweight 32 of the beam, which is carefully adjusted to offset the weight of the rod 3 and the friction of the operating wire-ropes, restores the beam automatically to the "open" position, where it is locked against any reverse turn of the point of double lock 39. In opening the beam 30, the wheel 33 revolves freely around the shaft 29. Then the various working parts, with their respective signals, etc., return to their original positions, ready for a further operation.

During the foregoing operation, the whistle of the locomotive continues to sound, as it is put into operation successively by the mechanism described in connection with Figs. 15 and 16, the arm 53 of which strikes successively on the aforesaid pegs 100 (see Fig. 2).

It will be seen from the foregoing description that my invention is purely mechanical and automatic in operation, that it offers every possible security and that in case of any failure to operate (which is well-nigh impossible), the aforesaid signals on the barrier-gates and distance posts warn the driver of any oncoming train that the barrier is not closed giving him time to reduce speed, so as to avert any disaster.

The embodiment above described is intended for use in connection with level crossings situated between two stations and on an uninterrupted section of the line, on which trains run without stopping. In cases, however, where the level crossings are disposed near stations, shuntings or goods-sidings or across busy thoroughfares, oncoming trains reduce their speed to, or even beyond, the time-limit allowed by the above described time-regulator, and moreover, the time allowed by the time regulator for slow and long goods trains may be considered by the busy public too long for fast and short express trains.

In order to avoid this difficulty, in a modification of my invention, I provide a second control box, similar to the control box 1, by means of which the barriers, after being closed by an approaching train as above described are reopened.

This second box is fixed on the ground alongside the track at the end of the section of level crossing furthest from an approaching train. The distance between this box and the level crossing must in no case be less than the length of the longest train, so that, after the whole train has passed the crossing, the barriers may be reopened by the action of this second box, which by means of the wire 105 (Figs. 13 and 18) brings down the slide 108, which presses down arm 41' and thus opens the lock and allows the barrier to reopen freely with the aid of the counterweight 32, which is adjusted to be exactly sufficient to overcome the weight of the barrier and the friction.

When this second box is employed to effect the reopening of the barriers, the time-regulator 24 is omitted and a device shown in Fig. 17 is used to release the boxes after they have accomplished their function.

The device shown in Fig. 17 comprises a drum 101, around which the wire rope 22 passes and which in being turned by the pull of the said wire-rope 22, causes the rotation of a smaller drum 102 fixed to the same shaft 124.

This movement is now transmitted by the wire-rope 22' and the pulley 103 to the releasing lever, which unlocks the locks of the two boxes and releases the springs therein contained, after they have fulfilled their function, i. e. ringing of the bells, the closing or reopening of the barriers and the operation of the signals.

The moment at which the locks are to be released may be regulated in view of the fact that, while the actuating springs of the boxes are operating as above by the pull of the wire-rope 22, the latter yields gradually until it reaches a point where the entire displacement of the wire-rope 22 causes the displacement of wire-rope 22', which suffices to unlock the locks of the spring boxes.

According to particular cases and distances, the diameters of the drums, the length of the spring 62, etc., can be varied as required.

I will now consider the case of two trains (an up-train and a down-train) meeting on the section of the same level crossing; and assume that one of these two trains is passing through the section before the other and is therefore about to reopen the barriers while the other train is still on the level crossing.

The arrangement shown in Fig. 18 prevents the first train from reopening the barriers before any other train has passed over the entire section of the level crossing.

If we suppose that the up-train is about to pass through the section before the down-train and that the wire rope 105 (Figs. 13, 18 and 20) has been made taut by the action of the up-train in order to pull the slide 108, whose function is, on its downward course, to depress the arm 41' so as to unlock the barriers and leave them free to open with the aid of the counterweight 32, then the said unlocking of the barriers can be effected unhindered provided a cam or eccentric 115 (Figs. 18 and 13) is not in the position shown in the drawings.

But if, in the above assumed case, a down-train is still on the level crossing section, this train, (which is the slower), on entering the section, will act upon the first spring box 1 on the down track and will cause a pull on the wire-rope 104 (Fig. 18). Said wire-rope 104 branches from the wire-rope 23'' (Figs. 14 and 2) strained by the first spring box of the down-line acted on by the down-train which is the slower. This pull will pull down the slide 107, which in descending will depress the arm 122 of the semicircular cylindrical eccentric 115 and will force it into the position shown in Fig. 18. This position will prevent the slide 108, which has been pulled down by the action of the up-train (which is the more advanced), from completing its downward course and releasing the lock 39' or unlocking the barriers before the down-train which is the slower has left the section, i. e. the protected distance of track containing the level crossing.

Figure 2:
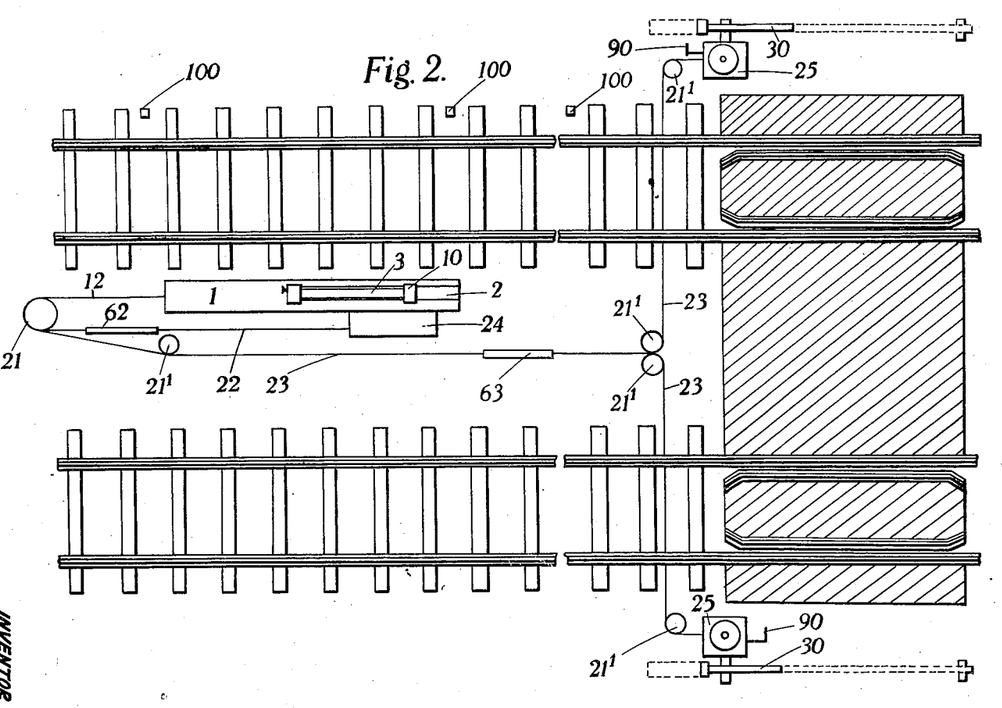
Fig. 2 is a plan corresponding to Fig. 1.
Figures 4, 5, 19A:
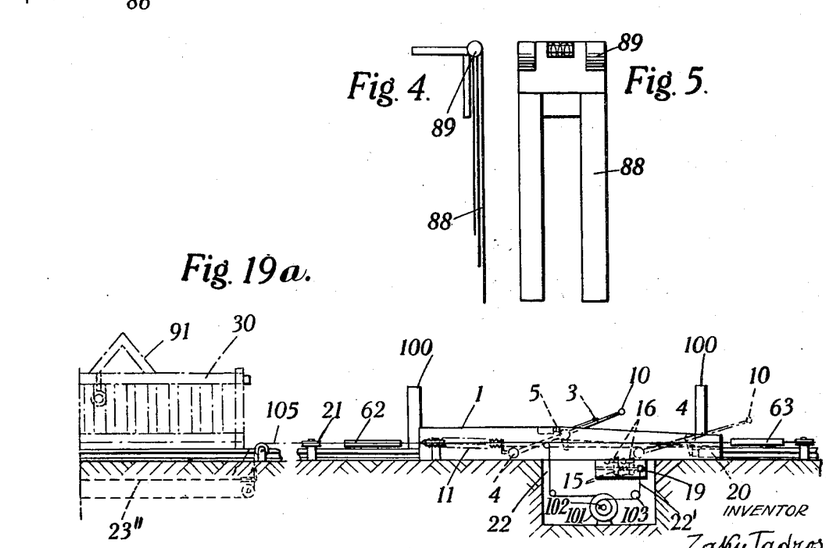
Figs. 4 and 5 are respectively a side and a front view of the attachment fitted to the locomotive.

The down-train then acts upon the second or last spring box alongside of the down-line and causes a pull on the wire-rope 106 (Fig. 18) branching from the wire-rope 105 strained by said last spring box actuated by the down-train (Figs. 18, 14 and 2). The said wire rope 106 in its turn draws down the slide 113, which, by means of an arm 114 fixed upon the eccentric 115, forces it into such a position as to leave the way clear for the slide 108 to descend freely until it encounters the arm 41' and thus unlocks the lock 39' and consequently opens the barriers 30 after the later train has entirely passed the level crossing.

The arrangement may obviously be employed regardless of the direction in which the faster train may be travelling.

Figure 20:
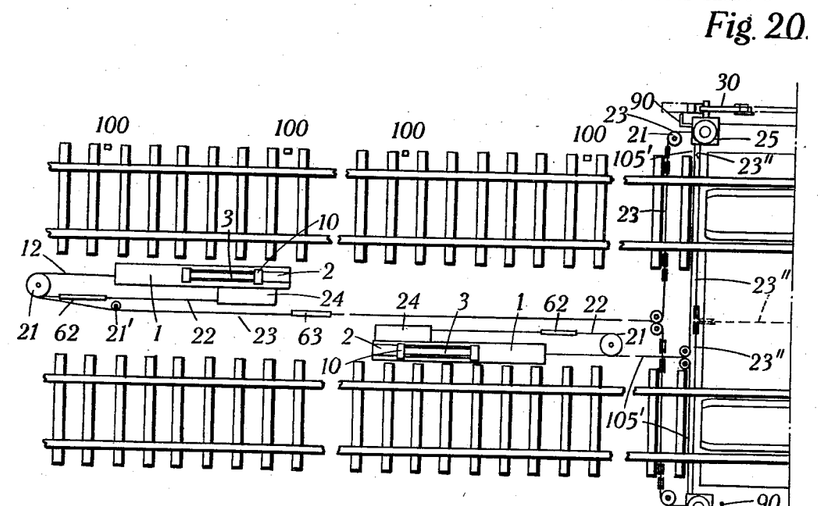
Figs. 20 and 20a are left and right-hand portions respectively of a plan view showing the modification in which the invention is applied to a double track.
Figure 20A:
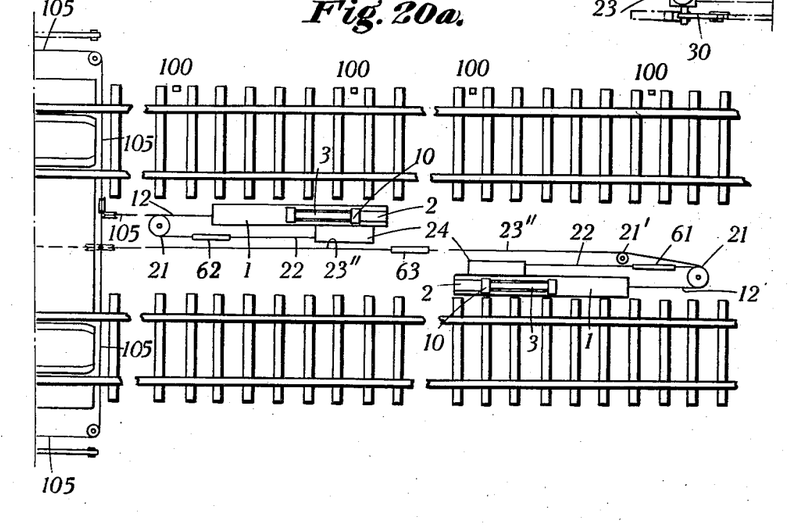

The manner of co-operation of the various parts in the double track arrangement will be understood from Fig. 20.

In connection with this arrangement the following members come into play:

(1) One slide 26 (Figs. 13 and 14) in each of the two barrier posts of the crossing.

The function of this slide is to release the double lock (locking the barrier in the open position), close the said barrier and lock it in the closed position.

(2) Two wire-ropes 23, 23" (Figs. 14, 13 and 2) branching from the two first spring boxes of the two tracks and attached to the lower end of the slide 26.

(3) One slide 108 (Figs. 18, 13 and 14) in each of the two barrier posts of the crossing.

The function of this latter slide is to unlock the double lock and consequently the barrier leaving it free to open with the aid of the counterweight 32.

(4) To the lower ends of the slides 108 are attached wire-ropes 105 and 105' (Figs. 14, 2, 13 and 18) branching from the two last spring boxes of the two railway lines.

(5) Two similar eccentric cams (of which only one cam 115 is shown on Figs. 18, 13 and 14 to avoid complication) in each of the two barrier posts.

(6) Two similar slides (of which only one slide 107 is shown on Figs. 18 and 14 to avoid complication) in each of the two barrier posts.

(7) Two similar counterweights (of which only one counterweight 109 is shown on Figs. 18 and 14 to avoid complication) in each of the two barrier posts.

(8) Two similar wire-ropes (of which only one wire-rope 104 is shown on Figs. 18 and 14 to avoid complication) in each of the two barrier posts.

One of the said two similar wire-ropes 104 branches from the wire-rope 23 actuated by the first spring box of the first track and the second wire branches from the wire-rope 23" actuated by the first spring box of the second track.

When either of these wire-ropes 104 is actuated it pulls down the slide 107 against the counterweight 109 so as to actuate one of the said two eccentric cams 115 so as to block the path of the slide 108 which is common to both cams.

(9) Two similar wire-ropes (of which only one wire-rope 106 is shown on Figs. 18 and 14 to avoid complication) in each of the two barrier posts.

One of the wire-ropes 106 branches from the wire-rope 105 (Fig. 14) actuated by the second spring box of the first track (Fig. 2); the second wire-rope branches from the wire-rope 105' actuated by the second spring box of the second track (Fig. 2).

As regards the slide 26, it must be remembered that this slide, after completing its downward course, reverses and moves upward to regain its normal position. Nevertheless, supposing that, while this slide in its upward course is passing the spiked wheel 33 and the barriers have not yet begun to rise, it should happen that this slide suddenly reversed its movement and began to descend, owing to a pull caused by a second train entering the level crossing section at the same moment; in that case, for this downward movement to be effected, it would be necessary for the spiked wheel 33 to be free to turn in that direction under the action of the slide; otherwise, either the spikes would be fouled or the slide would be stopped in its downward course, and prevented from fulfilling its object.

To allow the slide 26 to complete its downward course in such a contingency, the shaft 29 is fitted with a spring clutch 125 (Fig. 13) locking the wheel 36 to the shaft 29 and so arranged that both can be released from the clutch by a rigid arm or beam 126 fixed to the body of the barrier-gate and acting upon the clutch when the barriers are closed (i. e. when they are in a horizontal position) and thus allowing the spiked wheel 33 to turn freely with the slide, without hindering it from completing its downward course to perform its function.

The various working parts should be calculated in proportion to the distance required in each case between the mechanism and the level crossing.

It will be understood that I do not confine myself to the above mentioned measurements and details of the construction of the various working parts, inasmuch as many modifications may be made without altering the fundamental principles of the invention. Thus, the various essential component devices or mechanisms may be duplicated or multiplied so that if the one should fail to work, its counterpart can fulfil its function, until the necessary replacement or repair has been effected. Likewise, there may be employed more than one operating wire-rope, and also more than one set of locks and springs.

Figures 6, 7:
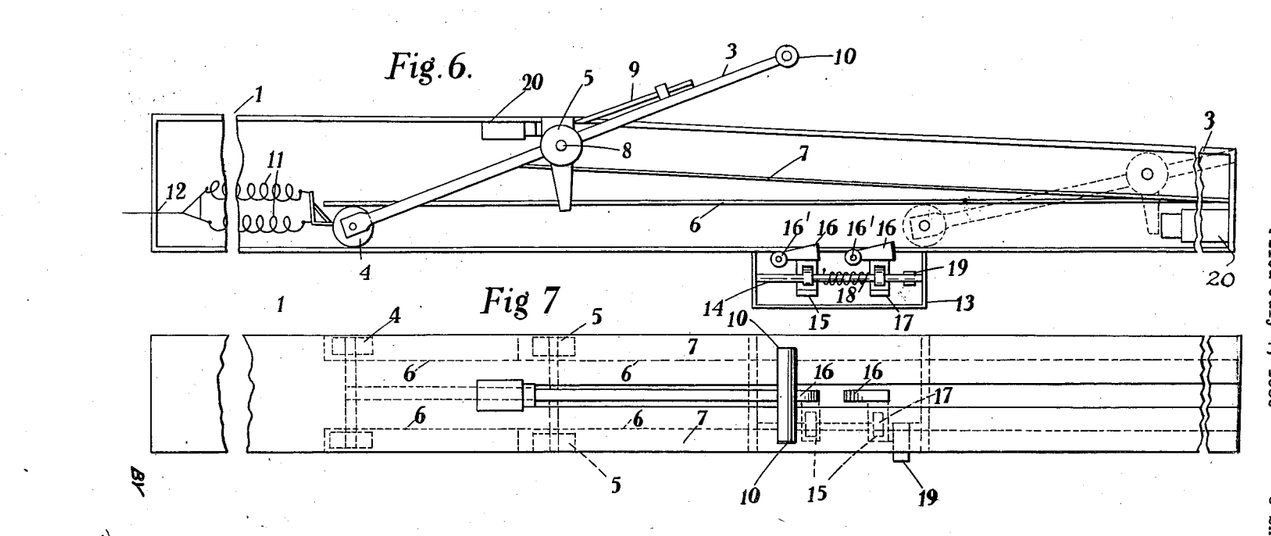
Fig. 6 is a cross section of a box containing a rod which operates the invention.
Fig. 7 is a plan corresponding to Fig. 6.

My invention could also, with some slight modification, be utilized for other purposes, such as, for instance, to warn the driver of a train of a sudden collapse of a bridge. In that case, the rod 3 would be held constantly, by a wire-rope connected with the bridge, in the upright position indicated by dotted lines (Figs. 1 and 6). If the wire-rope were broken, the rod 3 would return to its original position and by striking against the train, would warn the driver by means of some suitable device of the disaster. Moreover, the pegs 100 for operating the whistle may, if desired, be placed at all dangerous points, where the whistle will be sounded, and thereby avoiding the necessity of the driver having to sound it and its attendant risk.

I claim:

1. Apparatus for automatically operating a level crossing gate including gate closing means operatively connectable to said gate, said means comprising a gate actuating device arranged adjacent said gate and an operating member for said device adapted to be disposed adjacent the track at a predetermined distance from said level crossing, and connected to said device through the medium of a spring; means carried by a locomotive to displace said operating member to tension said spring, when said locomotive passes said member; means for retaining said member in its displaced position to allow the said spring to actuate said actuating device; and time-controlled means for releasing said retaining means to allow of the return of said gate to its open position.

2. In apparatus for automatically operating a level crossing gate the combination of: a casing arranged adjacent to the track at a predetermined distance from the level crossing; a rod slidable in said casing; a support at said level crossing; a rotatable shaft mounted on said support, a gate mounted on said shaft; a side member on said support having a spring connection to said rod; a wheel on said shaft having spikes on the periphery thereof, said spikes being engageable by said slide, on movement of said slide therepast, to rotate said wheel; means carried by a train passing said casing operable to displace said rod in said casing to tension said spring connection thereafter to cause said slide to actuate said wheel and close said gate.

3. Apparatus for automatically operating a level crossing gate by a passing train including a gate at said level crossing, a casing arranged adjacent to the track at a predetermined distance from the level crossing; converging guides in said casing; an upwardly projecting rod in said casing, said rod being slidable along said guides; a substantially vertically disposed fork member carried by said train, said member being slidably engageable with said rod and movable horizontally over said casing to displace said rod; a spring connection between said rod and said gate, the arrangement being such that said fork member entrains said rod initially near the upper end thereof, and during movement of said fork member, said rod is moved downwardly with respect to said fork member and is freed therefrom when said fork member reaches the end of said casing, said rod tensioning said spring connection thereafter to actuate said gate; spring catches for preventing the return movement of the rod to its normal position; and means for releasing said catches.

4. In apparatus of the type referred to the sub-combination of: a casing adapted to be placed adjacent to the track at a predetermined distance from the said level crossing; a rod slidable, through the medium of a train passing therepast, longitudinally in said casing for the purpose of actuating a level crossing gate; spring catches for retaining said rod at the end of its operating movement; a two-part cylindrical member, having co-operating helical end faces, said member being carried on a shaft associated with said casing, one part of said member being displaceable on said shaft against the action of a spring away from said other part after movement of the said rod in an operative direction; a projection on said displaceable part engageable with the aforesaid spring catches, such that when said member returns to its normal position at the end of the operating movement under the action of said spring, said projection engages said catches and releases said rod to allow the latter to return to its normal position.

5. Apparatus for automatically operating a level crossing gate including a casing arranged adjacent to the track at a predetermined distance from the level crossing; a rod slidable longitudinally in said casing under the influence of a train on said track passing said casing; a substantially vertical support at said level crossing; a level-crossing gate mounted on a shaft rotatably carried by said support; a slide member vertically movable on said support; a spring connection between said slide and said rod; a bell on said support; a hammer for said bell actuatable through the medium of gearing on movement of said slide; projections on said slide; a wheel on said shaft engageable by said projections to rotate said wheel to move said gate; and releasable means for retaining said rod in its displaced position, the arrangement being such that on movement of said rod said spring connection is tensioned thereafter to actuate said slide.

6. Apparatus for closing and opening a level crossing gate by a train passing over said crossing including a pair of casings arranged one on each side of said level crossing adjacent the track at a predetermined distance from said crossing; a rod slidably carried in each of said casings; a support for said gate at said level crossing; a slide substantially vertically movable on said support and having a spring connection to the rod in one of said casings; a shaft carried by said support on which said gate is mounted; a spiked wheel on said shaft arranged to be rotated on movement of said slide to close said gate; ratchet locking means carried by said support to hold the said gate in its closed position; spring catches mounted in said casing for retaining said rod in one end position; a second slide movable on said support and having a spring connection to said second rod, and said second slide being also operatively connectible with said ratchet locking means; and a common operating member for said rods arrangeable on said train, the arrangement being such that, on the passage of the train over the first aforesaid casing, the rod therein is moved longitudinally thereof to tension said spring connection thereafter to actuate said first mentioned slide to close said gate, and then, when the train has passed the said crossing, said rod in said second mentioned casing is moved longitudinally in its casing to tension said second spring connection and thereafter to release said ratchet locking means and allow of the return of said gate to its open position.

7. In apparatus for successively closing and opening a level crossing gate arranged adjacent a pair of tracks by a train passing over said crossing on each of said tracks including a pair of casings arranged on each side of said level crossing adjacent the tracks at a predetermined distance from said crossing; a rod slidably carried in each of said casings; a support for said gate at said level crossing; a substantially vertically movable first slide carried on said support; a spring connection between said slide and the rods in diagonally opposite casings one an each side of said crossing; a shaft carried by said support on which said gate is mounted; a spiked wheel on said shaft rotatable by said slide on movement thereof to close said gate; a second movable slide on said support engageable with said spiked wheel; a spring connection between said second slide and said other rods in said other casings, said other rods being also operatively connected to said spring catches; and a common operating member for the rods of the casings on each track respectively arrangeable on each of said trains.

8. In a train operated apparatus for automatically effecting a control operation, such as the closing of a level crossing gate, the sub-combination of: a casing adjacent the track at a predetermined distance from the level crossing; an upstanding rod displaceable longitudinally in said casing; means carried by said rod operatively connectible to a gate to be actuated; springs interposed in said connecting means; releasable spring catches carried by said rod for retaining said rod in displaced position; an independent operating member for said rod carried by said train, the arrangement being such that said train, on passing said casing, displaces said rod along said casing and into operative position to stress said springs in said connecting means, whereupon the said springs gradually detension to effect said control operation independently of the movement of said train.

9. In apparatus of the type referred to the sub-combination of: a support; a rotatable shaft on said support; a gate pivoted to said shaft; a slide longitudinally movable in said support; and a wheel on said shaft having spikes on the periphery thereof, said wheel being rotatable on passage of said slide therepast so as to move said gate.

10. In apparatus of the type referred to the sub-combination of: a support; a shaft rotatable in said support; a gate carried by said shaft; a wheel on said shaft; a one-way connection between said wheel and said shaft, whereby said wheel on rotation only in one direction rotates said shaft; a slide movable along said support; a projection on said slide; a plurality of spikes on said wheel with which said projection may engage, the arrangement being such that on movement of said slide, said wheel is rotated to close said gate.

11. In apparatus of the type referred to the sub-combination of: a support; a rotatable shaft carried by said support; a gate carried by said shaft; a spiked wheel mounted on said shaft; a one-way connection between said wheel and said shaft, whereby said wheel is rotatable in one direction to move said gate and in the other direction independently of said gate; ratchet means carried by said support for retaining said gate in the open position; a slide movable in said support; a projection on said slide engageable with said ratchet means; a plurality of pins on said slide engageable with said spiked wheel, whereby on movement of said slide said ratchet means is first released and then said spiked wheel is rotated to lower said gate; and releasable means for locking said gate in the closed position.

12. In apparatus of the type referred to a level crossing gate including the sub-combination of: a support; a shaft rotatably mounted on said support; a gate carried by said shaft; a spiked wheel mounted on said shaft; a first slide movable longitudinally in said support; a lock device carried by said support for locking said gate in the open position; a single projection on said slide engageable with said lock; a plurality of pins on said slide engageable with said spiked wheel; locking means for locking said gate in the closed position; and a second slide in said support, whereby on movement of said first-mentioned slide said first-mentioned projection thereon releases said lock and then said plurality of pins consecutively engage said spiked wheel to rotate said shaft and lower said gate, and on movement of said second slide said closed position locking means is released to enable said gate automatically to re-open and said first-mentioned slide to return to its initial position.

13. In apparatus of the type referred to, gate operating mechanism including the combination of: a casing adapted to be arranged adjacent to the track at a predetermined distance from the level crossing; converging guides mounted in said casing; an upwardly projecting rod slidable longitudinally on said guides for the purpose of initiating a mechanical operation; a group of springs attached to the lower end of said rod and adapted on movement of said rod to absorb and store a force sufficient for the gradual carrying out of said operation; an independent operating member for said rod carried vertically by a train and arranged to be passed over said rod to displace said rod along said guides; and releasable spring locks carried by said casing for retaining said rod in displaced position, the arrangement being such that the said rod is released from said member after said group of springs is sufficiently stressed and is held by said spring locks.

14. In a train operated apparatus for automatically effecting a control operation, such as the closing of a level crossing gate, the sub-combination of: a casing adjacent the track at a predetermined distance from the level crossing; an upstanding rod displaceable longitudinally in said casing; means carried by said rod operatively connectible to a gate to be actuated; springs interposed in said connecting means; releasable spring catches carried by said rod for retaining said rod in displaced position; an independent operating member for said rod carried by said train, the arrangement being such that said train on passing said casing displaces siad rod along said casing and into operative position to stress said springs in said connecting means, whereupon said springs gradually detension to effect said control operation independently of the movement of said train; and time-controlled means for releasing said spring catches.

ZAKY TADROS.